United States Patent [19]

Herlihy, Jr.

[11] Patent Number: 5,415,924

[45] Date of Patent: May 16, 1995

[54] WATERPROOF, BREATHABLE FABRIC FOR OUTDOOR ATHLETIC APPAREL

[75] Inventor: Daniel J. Herlihy, Jr., Bethany Beach, Del.

[73] Assignee: Aquatic Design, Bethany Beach, Del.

[21] Appl. No.: 14,237

[22] Filed: Feb. 5, 1993

[51] Int. Cl.⁶ .................. B32B 15/00; B32B 17/00; D03D 3/00

[52] U.S. Cl. .................. 428/284; 428/247; 428/318.4; 428/286; 428/287

[58] Field of Search ............... 428/109, 131, 137, 138, 428/284, 224, 285

[56] References Cited

U.S. PATENT DOCUMENTS

| | | | |
|---|---|---|---|
| Re. 30,972 | 6/1982 | Kyle et al. | 428/219 |
| 2,981,954 | 5/1957 | Garbellano | 2/2.1 |
| 3,367,329 | 2/1968 | Dibelius | 128/156 |
| 3,709,221 | 1/1973 | Riely | 128/156 |
| 3,870,593 | 3/1975 | Elton et al. | 161/159 |
| 3,932,682 | 1/1976 | Loft et al. | 428/296 |
| 3,953,566 | 4/1976 | Gore | 264/288 |
| 4,194,041 | 3/1980 | Gore et al. | 428/321 |
| 4,234,637 | 11/1980 | Sewell et al. | 428/338 |
| 4,367,327 | 1/1983 | Holker et al. | 428/423.1 |
| 4,429,000 | 1/1984 | Naka et al. | 428/286 |
| 4,443,511 | 4/1984 | Worden et al. | 428/284 |
| 4,479,268 | 10/1984 | Tillbrook | 2/170 |
| 4,483,019 | 11/1984 | Spangrud et al. | 2/275 |
| 4,493,870 | 11/1985 | Vrouenraets et al. | 428/245 |
| 4,499,139 | 2/1985 | Schortmann | 428/290 |
| 4,510,197 | 4/1985 | Shah | 428/220 |
| 4,537,817 | 8/1985 | Guillaume | 428/284 |
| 4,539,255 | 9/1985 | Sato et al. | 428/286 |
| 4,569,874 | 2/1986 | Kuznetz | 428/285 |
| 4,589,804 | 5/1986 | Paeglis et al. | 428/244 |
| 4,600,001 | 7/1986 | Gilman | 428/156 |
| 4,610,915 | 9/1986 | Crenshaw et al. | 428/287 |
| 4,613,544 | 9/1986 | Burleigh | 428/315.5 |
| 4,632,860 | 12/1986 | D'Antonio et al. | 428/290 |
| 4,761,324 | 8/1988 | Rautenberg et al. | 428/198 |
| 4,778,460 | 10/1988 | Braun et al. | 428/296 |
| 4,803,116 | 2/1989 | Amano et al. | 428/286 |
| 4,808,675 | 2/1989 | Twilley et al. | 428/252 |
| 4,809,447 | 3/1989 | Pacanowsky et al. | 428/253 |
| 4,819,345 | 4/1989 | Mulcahy et al. | 36/55 |
| 4,828,556 | 5/1989 | Braun et al. | 428/913 |
| 4,828,772 | 5/1989 | Lopatin et al. | 264/45.9 |
| 4,847,142 | 7/1989 | Twilley et al. | 428/252 |
| 4,871,600 | 10/1989 | Amann | 428/286 |
| 4,872,220 | 10/1989 | Haruvy et al. | 428/286 |
| 4,907,295 | 3/1990 | Yasuda | 2/272 |
| 4,913,957 | 4/1990 | Strack et al. | 428/286 |
| 4,933,231 | 6/1990 | Seber | 428/296 |
| 4,943,475 | 7/1990 | Baker et al. | 428/286 |
| 4,972,522 | 11/1990 | Rautenberg | 2/67 |
| 5,032,450 | 7/1991 | Rechlicz et al. | 428/290 |
| 5,036,551 | 8/1991 | Dailey et al. | 2/167 |
| 5,052,053 | 10/1991 | Peart et al. | 2/2.1 R |
| 5,064,703 | 11/1991 | Frankosky et al. | 428/288 |
| 5,068,920 | 12/1991 | Bray | 2/79 |
| 5,069,677 | 12/1991 | Sakurai et al. | 604/367 |
| 5,090,074 | 2/1992 | Scales et al. | 5/448 |
| 5,126,189 | 6/1992 | Tanny et al. | 428/288 |
| 5,147,401 | 9/1992 | Bakker et al. | 623/15 |
| 5,149,576 | 9/1992 | Potts et al. | 428/286 |

OTHER PUBLICATIONS

Properties of Fine Denier Filament Polypropylene; Filament Fiber Technology, Inc.; Sep. 1991.

*Primary Examiner*—George F. Lesmes
*Assistant Examiner*—Kathryne E. Shelborne
*Attorney, Agent, or Firm*—Wigman, Cohen, Leitner & Myers

[57] ABSTRACT

A layered fabric for constructing action sportswear. The fabric generally comprises the following three layers: (1) a shell fabric comprised of a blend of polypropylene filaments and LYCRA ® brand spandex fibers, (2) a waterproof membrane laminated to the back of the shell fabric, and (3) a mesh lining, attached to the back of the membrane. The fabric has the qualities of being waterproof, breathable, and elastic and possess a number of other qualities which are highly desirable in action sportswear.

13 Claims, 1 Drawing Sheet

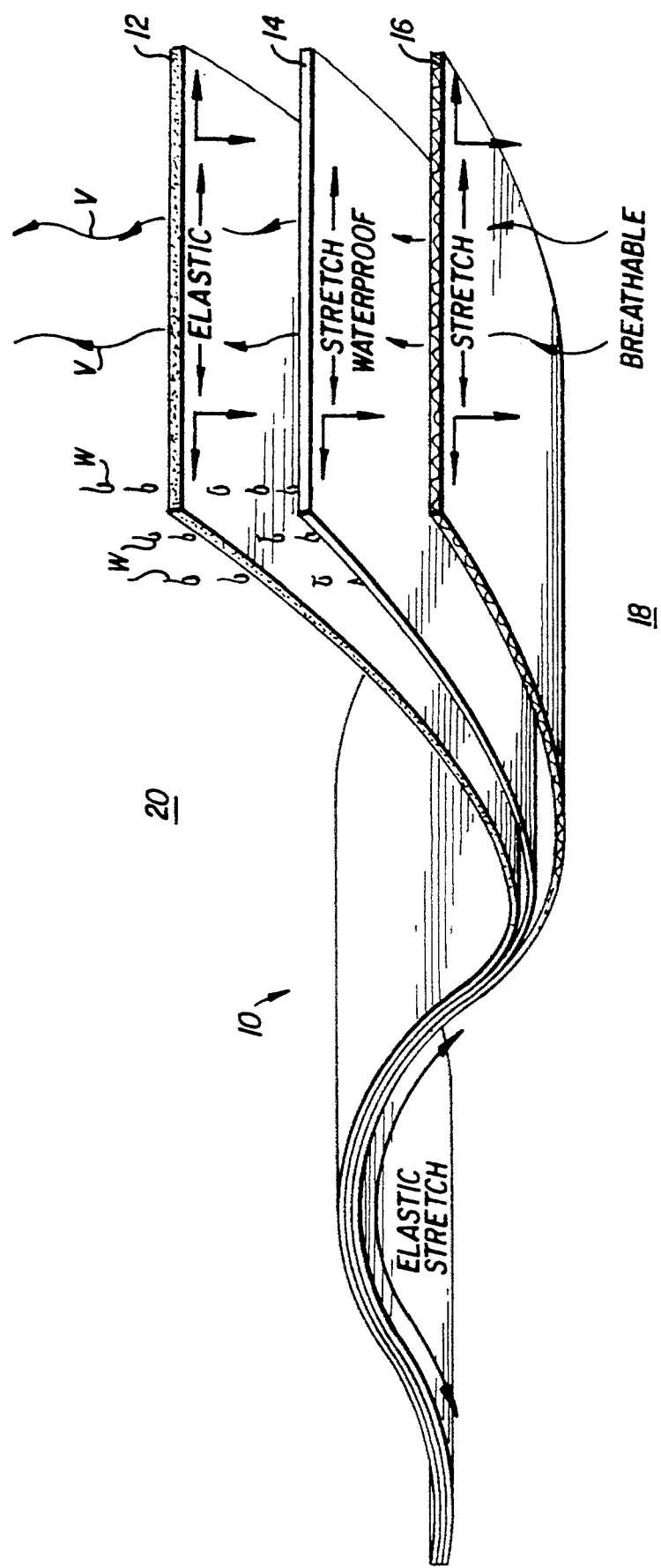

WATERPROOF, BREATHABLE FABRIC FOR OUTDOOR ATHLETIC APPAREL

FIELD OF THE INVENTION

The present invention relates generally to fabrics for constructing athletic apparel, and more particularly to fabrics that are waterproof, breathable and elastic, and which possess a number of other characteristics that are highly advantageous in action sportswear.

BACKGROUND OF THE INVENTION

Outdoor sports which involve a great deal of aerobic activity on the part of the athlete, such as surfing, bicycling, skiing and the like require apparel having certain desired characteristics, as follows:

1. Low Thermal Conductivity

An important feature of surfing apparel, for example, is its ability to insulate the wearer from the cold water. This is especially important as surfing is increasingly becoming a year-round sport and surfers seek to practice their sport in the winter months. Likewise, in the sport of bicycling, the wind chill factor creates a particular need for insulating garments, especially when riding down-hill at high speeds.

2. Abrasion Resistance and High Tensile Strength

The ability to resist abrading is an essential quality of any garment worn by body surfers and bicyclists.

Body surfers, who ride waves without the benefit of a surfboard, frequently slide against the surface of the rocky and sandy ocean floor as the wave approaches the beach. This can cause enormous friction between the surfer's body and the ocean floor. Accordingly, any garment worn must be able to resist tearing so as to prevent abrasions and burns to the wearer.

Clothing worn by bicyclists must likewise be strong and abrasion resistant as serious abrasions can result from falls against pavement when riding at high speeds.

3. Vapor Permeable

The sports of surfing, bicycling and running are highly aerobic in nature and therefore cause significant perspiration on the part of the athlete. Accordingly, the clothing worn by these athletes must allow the perspiration of the wearer to evaporate in the form of water vapor which can readily pass through the garment (i.e. "breathe").

4. Lightweight

In bicycling, running and surfing, especially during competition, light weight is a critical characteristic of garments demanded by most athletes. Variations of only a few ounces can often have an impact on athletic performance. Moreover, with surfwear, it is obviously preferable that the fabric worn be lighter than water.

5. Colorfast and Sunfast

The current market for athletic wear demands clothing which is not only functional but also fashionable. This is particularly true of beachwear, where trends and fads routinely dictate seasonal color schemes. Often, these colors are bright, distinctive, and even fluorescent. Hence, the fabric must retain its color after exposure to sun, perspiration, or washing.

6. Stain and Odor Resistant

Stains and odors are obvious problems with outdoor athletic apparel. With regard to surf-wear in particular, there is a risk of stains from algae and similar marine organisms as well as oil and other pollutants present at many beaches. These organisms and pollutants, together with perspiration, can also cause odors.

7. Hold, Mildew and Bacteria Resistant

Water provides a habitat for many different microorganisms. Among the bacteria most commonly found in natural waters are sulfur bacteria, iron bacteria, free-living spriral forms, certain pigmented and nonpigmented species, and some spore-formers. Similarly, fungi such as molds and mildew, merely require abundant moisture, a supply of organic matter, and a supply of oxygen for growth.

Hence, apparel worn for surfing and other outdoor sports should ideally be resistant to bacteria and fungi.

8. Waterproof

Many surfers, especially those who practice their sport in cold water, prefer to wear waterproof apparel commonly referred to as "dry suits." Such apparel not only allows the addition of insulating layers, but also permits athletes with cuts and abrasions to surf while protecting their wounds from the salt water. Dry suits are also more comfortable to many surfers. Similarly, the quality of being waterproof is desirable for apparel worn by skiers.

Moreover, many bicyclists and runners prefer waterproof apparel, as they frequently encounter unanticipated precipitation while riding or running.

9. Wind Resistance

Wind resistance is an important quality for bicyclists due to the wind chill factor inherent in riding downhill at high speeds as with surfers who frequently ride waves at speeds exceeding 20 mph. Even faster speeds are achieved during downhill skiing.

10. Elasticity

Elasticity is the extent of elongation of the fabric upon application of tension, and the recovery to original length and shape when the tension is released. This is an essential feature of any garments worn by bicyclists and surfers who prefer garments which are snug but flexible and comfortable. In fact, the current market for surfwear, bicyclewear and skiwear is dominated by apparel which is "form fitting" and "skin-tight" rather than that which is loose and baggy.

While most prior art fabrics possess some of the above characteristics and a few possess the majority thereof, no known fabric possesses all of these characteristics. For example, a fabric which has been found to possess the first seven of the ten characteristics listed above may be constructed from a fine denier filament polypropylene yarn sold under the trademark TELAR® by Filament Fiber Technology of Bay Head, N.J. TELAR® is a filament comprised primarily of polypropylene, a parafin-based synthetic fiber classed under the generic name of olefin. According to Fairchild's Dictionary of Textiles, Sixth Edition, known uses of polypropylene fibers include upholstery fabrics, sweaters, swimwear, women's hosiery, and rugs.

However, it has heretofore been unknown to employ polypropylene filaments in garments which are waterproof, wind resistant, and elastic, which, as stated, are desirable for the sports of surfing and the like.

There also exists in the art several fabrics which have the combined characteristics of being waterproof, breathable, and stretchable. For example, U.S. Pat. No. 4,443,511 to Worden et al. discloses a waterproof and breathable elastomeric polytetrafluoroethylene (PTFE) layered article. Other examples of elastic fabrics which are waterproof and breathable are disclosed in U.S. Pat. No. 4,972,522 to Rantenberg, and U.S. Pat. No.

5,036,551 to Dailey et al. However, these fabric are also unsuitable for constructing garments for outdoor sports because they lack other essential qualities such as abrasion resistance, low thermal conductivity, lightweight, colorfastness, and resistance to stain, odor, and bacteria.

It should be apparent, therefore, that there still exists a need in the art for a fabric for constructing outdoor athletic apparel which possesses all of the desired characteristics discussed above.

SUMMARY OF THE INVENTION

The present invention, therefore, is directed to a layered fabric which is insulating, abrasion resistant, breathable, lightweight, colorfast, sunfast, and resistant to stains, odors, mold and mildew, while at the same time being both waterproof, wind resistant and elastic. The invention generally comprises the following three layers: (1) a shell fabric comprised of a blend of polypropylene filaments and LYCRA ® brand spandex fibers, (2) a waterproof membrane laminated to the back of the shell fabric, and (3) a mesh lining, attached to the back of the membrane. More particularly, the polypropylene filaments which comprise the first layer are preferably continuous and, ideally, of a fine denier such as 100 or less.

A principal advantage of the fabric of the present invention is that it is waterproof but has the ability to allow moisture vapor to pass therethrough.

Another advantage of the fabric of the present invention is that it provides thermal insulation and wind resistance.

Yet another advantage of the fabric of the present invention is that it is stretchable and elastic.

A further advantage of the fabric of the present invention is that it has a high tensile strength and is highly resistant to abrasion.

Another advantage of the fabric of the present invention is that it is lightweight.

Still another advantage of the fabric of the present invention is that it is colorfast and sunfast.

A further advantage of the fabric of the present invention is that it is resistant to stains and odors.

Another advantage of the fabric of the present invention is that it is resistant to mold, mildew, and bacteria.

With the foregoing and other objects, advantages and features of the invention that will become hereinafter apparent, the nature of the invention may be more clearly understood by reference to the following detailed description of the invention, the appended claims and to the attached drawing.

BRIEF DESCRIPTION OF THE DRAWING

FIG. 1 is a schematic view of the three-layered fabric of the present invention.

DETAILED DESCRIPTION OF THE INVENTION

The fabric of the present invention is illustrated schematically in FIG. 1, and referred to generally by the numeral 10. Fabric 10 preferably comprises an outer shell fabric 12 made from a blend of continuous polypropylene filaments and another fiber having elastomeric properties such as spandex; a waterproof, breathable, stretchable membrane 14 laminated to the back of shell fabric 12; and a mesh lining 16 attached to the back of membrane 14.

More particularly, shell fabric 12 is comprised primarily of continuous polypropylene filaments. The polypropylene filaments employed in the shell fabric are preferably of a fine size, no greater than about 150 denier and ideally no greater than 100 denier. ("Denier" is equivalent numerically to the number of grams per 9000 meters; hence, the higher the denier, the heavier the filament.) Polypropylene filaments of a suitable denier are known to be produced by Filament Fiber Technology, Inc. of Bay Head, N.J. (FFT) and sold by FFT under the Trademark TELAR ®. (References below to "polypropylene" should be construed to mean continuous polypropylene filaments, preferably of a fine denier.)

While polypropylene filaments have good resiliency (i.e. recoverability to original size and shape after being crushed or wrinkled), they do not have outstanding elasticity (i.e. ability to elongate upon application of tension and recover to original length and shape when tension is released). The quality of elasticity is not particularly important in many of the articles in which polypropylene is commonly used, such as upholstery and carpets. It is, however, a very important quality in garments worn by surfers, runners, and bicyclists.

In order to increase the elasticity of the shell fabric 12, an elastomeric fiber is blended with the polypropylene filaments. The elastomeric fiber employed is preferably LYCRA ® brand spandex fiber produced by the E. I. du Pont de Nemours Co. Such a fiber has remarkable elasticity, high strength, abrasion resistance and a flex life greater than conventional elastic threads. A preferred composition of shell fabric 12 is 85% polypropylene and 15% spandex.

An important characteristic that is not inherent in shell fabric 12, but one that is critical for garments worn by surfers, is waterproofness. In order to provide fabric 10 with this quality, a waterproof membrane 14 is laminated to the back of shell fabric 12.

Membrane 14 may be any waterproof but breathable material, which is either non-porous or porous. A preferred material is Sympatex ®, a proprietary material of AKZO Fibers Inc. of Newburyport, Mass. Sympatex is a non-porous laminate film which may be bonded with adhesive or by heat fusion to shell fabric 12. The "dot method" may be employed to adhere the film to fabric 12. Sympatex ® has high abrasion resistance and flex tolerance, thereby allowing fabric 10 to stay waterproof even after extensive use over many years. Sympatex ® is described more particularly in U.S. Pat. No. 4,493,870 (expressly incorporated herein by reference) as a waterproof film material of a copolyether ester consisting of a plurality of recurrent intralinear long-chain ester units and short-chain ester units which are randomly joined head-to-tail through ester bonds. The long chain ester units correspond to the formula:

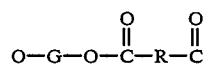

and the short-chain ester units correspond to the formula:

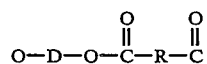

where G is a divalent radical remaining after removal of terminal hydroxyl groups from at least one long-chain glycol having a molecular weight in the range of 800 to 6000 and an atomic ratio of carbon to oxygen in the range of 2.0 to 4.3 at least 70% by weight of the long chain glycol having a carbon to oxygen ratio in the range of 2.0 to 2.4, R is a divalent radical remaining after removal of carboxyl groups from at least one carboxylic acid having a molecular weight less than 300, and D is a divalent radical remaining after removal of hydroxyl groups from at least one diol having a molecular weight less than 250, at least 80 mole % of the dicarboxylic acid used consisting of terephthalic acid or the ester forming equivalents thereof and at least 80 mole % of the low molecular weight diol consisting of 1,4-butanediol or the ester forming equivalents thereof, the sum of the mole percentages of the dicarboxylic acid which is not terephthalic acid or the ester forming equivalents thereof and of the low molecular weight diol which is not 1,4-butanediol of the ester forming equivalents thereof is not higher than 20 and the short-chain ester units form 50–75% by weight of the copolyether ester.

In lieu of Sympatex ®, other waterproof, breathable laminates may be employed to form membrane 14. For example, a porous membrane of expanded polytetrafluoroethylene (PTFE) may be employed as membrane 14. PTFE is made by following the techniques of U.S. Pat. No. 3,953,566. Such membranes and modified forms thereof are commercially available under the registered trademark GORE-TEX ®, sold by W. L. Gore & Associates, Inc. These expanded, porous PTFE membranes satisfy the requirements of being waterproof while also being permeable to the flow of water vapor. The expanded porous PFTE membranes are inherently hydrophobic and contain very small pores that resist the entry of liquid water even at substantial pressures or when rubbed or flexed, but readily allow the flow of gases including water vapor.

In use, membrane 14 functions to keep the wearer dry by preventing the flow of water (designated "W" in FIG. 1) through the fabric 10 while allowing perspiration in the form of vapor (designated "V" in FIG. 1) to evaporate from the wearer to the outside of the fabric 10.

In order to protect the membrane 14 and to increase the comfort to the wearer, a lining 16 is attached to membrane 14 opposite the side on which the membrane is laminated to shell fabric 12. The lining 16 is preferably constructed of a tricot mesh material. Tricot is a warp knit fabric made with two sets of threads.

Fabric 10 of the present invention comprises the following characterics, all of which are particularly important with regard to surfing and biking apparel:

MOVEMENT OF MOISTURE

Fabric 10 has the ability to move moisture in the vapor phase from one side of the fabric to the other where it can evaporate into the atmosphere. Hence, it does not seal moisture in against the skin as most other synthetic fabrics do. This also allows the fabric to dry faster and prevents the cold, clammy feeling to the wearer from having water trapped against his or her skin which often occurs with non-breathable fabrics.

With reference to FIG. 1, water vapor, designated by the arrows V, is shown moving from the inside 18 of the fabric to the outside 20 of the fabric where it evaporates into the atmosphere. In particular, the vapor may easily pass through lining 16, which, as a mesh, is inherently breathable. Membrane 14, is preferably comprised of Sympatex ® which has a vapor transmission rate of at least 1000 g/m² day. Likewise, shell fabric 12 is constructed substantially of polypropylene fibers which are also inherently breathable.

LOW THERMAL CONDUCTIVITY

The lower the thermal conductivity of a material, the slower heat is transported through it, (in the case of fibers, along their lengths and across their diameters). Polypropylene, the principle component of shell fabric 12, has the lowest thermal conductivity of all common apparel fibers as shown by the following chart:

| Fiber: | Thermal Conductivity |
| --- | --- |
| Polypropylene | 6 |
| PVC | 6.4 |
| silk | 7 |
| polyester | 7.3 |
| wool | 8 |
| acrylic | 8 |
| nylon | 10 |
| viscose | 11 |
| cotton | 17.5 |

ABRASION RESISTANCE

The abrasion resistance of fabric 10 which, as stated is particularly important for biking and surfing apparel, primarily depends upon the abrasion resistance properties of shell fabric 12 since this comprises the outer layer. Polypropylene is ranked with nylon in its excellent ability to resist abrasions.

| Fiber: | Abrasion Resistance: |
| --- | --- |
| polypropylene | excellent |
| nylon | |
| cotton | good |
| spandex | |
| polyester | |
| flax | fair |
| wool | |
| silk | |
| rayon | |
| acrylic | |
| acetate | poor |

STRENGTH

Shell fabric 12 is very strong because polypropylene, with a strength range of 4.8–7.0 grams per denier, is one of the strongest fibers. Nylon, which is widely regarded as a strong fiber, has a strength range of 2.5–7.3 grams per denier. Moreover, nylon loses 15% of its strength when wet, which polypropylene does not.

Membrane 14 and lining 16 also contribute to the overall strength of fabric 10.

| ABSORBENCY | |
| --- | --- |
| Fiber: | Moisture regain: |
| polypropylene | 0.05 |
| polyester | 0.4 |
| acrylic | 1.6 |
| nylon | 4.5 |
| acetate | 6.5 |
| cotton | 8.0 |
| silk | 11.0 |
| rayon | 13.0 |
| wool | 16.0 |

As the above chart illustrates, polypropylene is among the least absorbent of the textile fibers. Since little moisture is absorbed into the fiber shafts, drying time is kept to a minimum. Hence, while the shell fabric 12 is not itself waterproof, because water is not absorbed into the polypropylene fiber shafts, the wearer can easily shake off the excess water.

Membrane 14 is, of course, waterproof; the absorbency of lining 16 is irrelevant since it is protected from water by the membrane 14.

WEIGHT

Fabric 10 is particularly light-weight, which, as stated, is a particular advantage in garments worn by athletes since the weight of a garments can greatly impact athletic performance.

One study examined the effect of increased weight on bicycling performance and produced the following data:

| bicycling 100 yards from a standing start: | |
|---|---|
| + 2 lbs. | 1.3 ft. lag |
| + 6 lbs | 4.1 ft. lag |
| bicycling on a 10 degree slope (1 mi. ascent, 1 mi. descent) | |
| + 2 lbs | 97 ft. lag |
| + 6 lbs | 289 ft. lag |

(Bicycling Magazine, April, 1988.)

Specific Gravity

Polypropylene, which largely comprises shell fabric 12, is one of the lightest of all apparel fibers, as seen from the following table:

| | |
|---|---|
| polypropylene | 0.91 |
| nylon | 1.14 |
| acrylic | 1.17 |
| wool | 1.32 |
| silk | 1.34 |
| polyester | 1.38 |
| PVC | 1.38 |
| cotton | 1.50 |
| rayon | 1.52 |

On a scale with water set at 1.0, polypropylene has a specific gravity of 0.91, the only fiber listed weighing less than water. Hence, garments constructed of polypropylene can provide bulk and warmth without being heavy. Referring to the table above, cotton is 60% heavier than polypropylene, wool 40% heavier, polyester 52% heavier.

Additionally, polypropylene is perhaps the only fiber that does not add to the wearer's weight when wet. This is a particular advantage with respect to apparel worn by surfers.

Membrane 14 and mesh lining 16 are similarly light in weight.

STAIN RESISTANCE

Polypropylene is an inert polymer, and is therefore fabric 10 does not stain readily.

COLORFASTNESS

Because it is made substantially from polypropylene, shell fabric 12, the outermost layer of fabric 10, is extremely resistant to fading and bleeding. In fact, dark and light colored garments comprised of this fabric can be safely washed together. Garments dyed with a given pigment batch match other garments dyed with the same pigment years earlier.

STATIC RESISTANCE

Static resistance is an important property affecting the comfort of fabric 10. Especially in the winter, static makes garments unpleasant to put on and uncomfortable to wear. As the following chart makes clear, polypropylene is among the better fibers with respect to static resistance.

| Fiber: | Static Resistance: |
|---|---|
| glass | excellent |
| spandex | |
| polypropylene | good |
| cotton | |
| flax | |
| rayon | |
| wool | fair |
| silk | |
| acetate | |
| acrylic | poor |
| nylon | |
| polyester | very poor |

PILLING RESISTANCE

Pilling is a process of forming small tangles of fibers when the surface of a material is rubbed either against itself or a foreign substance. The following chart ranks a given fiber's ability to resist pilling.

| Fiber: | Ranking: |
|---|---|
| glass | excellent |
| spandex | |
| polypropylene | good |
| flax | |
| silk | |
| cotton | |
| acetate | |
| rayon | |
| wool | fair |
| acrylic | |
| nylon | poor |
| polyester | very poor |

Pilling resistance, like static resistance, is a property that affects a garment's appearance and comfort. Since polypropylene is the only man-made non-cellulosic fiber that scores high in both static resistance and pilling resistance, the fabric 10 is highly advantageous in this regard.

CHEMICAL INERTNESS

The fabric 10 is highly resistant to chemical attack because polypropylene is the most chemically resistant of all synthetic fibers. It is very resistant to acids (at room temperature), alkalies (at room temperature), alcoholic solvents, silicon oils, and greases.

Chlorine falls among the chemicals to which polypropylene is resistent—giving the fabric 10 tremendous potential for pool and water-related uses such as bathing suits.

MOLD, MILDEW, AND BACTERIA RESISTANCE

The fabric 10 is not affected by mold, mildew or bacteria because polypropylene cannot support these organisms in normal use, and is never damaged by them. It holds no moisture and is not a substance with which they can support their "nutritional" needs.

ELASTICITY

Fabric 10 is rendered elastic by virtue of the LYCRA ® or similar elastomeric fiber which is blended with the polypropylene to construct outer shell fabric 12. Shell fabric 12 is elastic in all four directions because of the spandex fibers included in the blend. The remaining layers, namely, membrane 14 and lining 16, while not inherently elastic, are sufficiently stretchable so as not to inhibit the elasticity of the composite fabric 10.

The arrows of FIG. 1 illustrate the elasticity or stretchability of the respective layers.

The elasticity of fabric 10 is an important quality in apparel worn by bicyclists and surfers which prefer garments which are tight, rather than baggy, while at the same time allowing the wear to move freely.

WATERPROOFNESS

As stated, a critical characteristic of fabric 10 is its waterproofness. Accordingly, fabric 10 may be used advantageously to construct "dry suits" worn by surfers.

The waterproofness of fabric 10 is due to membrane 14. As illustrated in FIG. 1, water, W, which may for example be rain or ocean water, penetrates shell fabric 12 but is repelled by membrane 14.

Fabric 10 will also be wind resistant due to the wind resistant characteristics of membrane 14.

In use, fabric 10 will undergo the known cut, make, and trim (CMT) processes to construct apparel specifically designed to be worn during surfing, biking, and other outdoor action sports. Apparel so constructed will have the qualities of being insulating, abrasion resistant, breathable, lightweight, colorfast, sunfast, and resistant to stains, odors, mold and mildew while at the same time being both waterproof, wind resistant and elastic.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A layered fabric for use in constructing sports apparel comprising:
    a first fabric layer comprised of a blend of polypropylene filaments and an elastomeric fiber;
    a second layer, comprising a waterproof, breathable, stretchable membrane laminated to said first layer; and
    a third layer comprising a mesh fabric protective lining attached to the side of said second fabric opposite the side to which the first fabric is laminated.

2. The fabric of claim 1 wherein said polypropylene filaments of said first layer are continuous.

3. The fabric of claim 1 wherein said polypropylene filaments of said first layer are of a denier no greater than 100.

4. The fabric of claim 1, wherein said elastomeric fiber is a spandex fiber.

5. The fabric of claim 1, wherein said first layer has a thermal conductivity no greater than 6 times that of air.

6. The fabric of claim 1, wherein said first layer is abrasion resistant.

7. The fabric of claim 1, wherein said first layer has a strength of between 4.8 and 7.0 grams per denier.

8. The fabric of claim 1, wherein said first layer has a specific gravity less than that of water.

9. The fabric of claim 1, wherein said first layer is generally resistant to mold, mildew and bacteria.

10. The fabric of claim 1, wherein said first layer is generally resistant to stains and colors.

11. The fabric of claim 1, wherein said first layer is generally colorfast and sunfast.

12. The fabric of claim 1, wherein said first layer is generally resistant to pilling.

13. The layered fabric of claim 18, said third layer comprising a tricot mesh material.

* * * * *